(12) United States Patent
Kinzie et al.

(10) Patent No.: US 9,125,394 B2
(45) Date of Patent: *Sep. 8, 2015

(54) ULTRASONIC SOUND EMITTING DEVICES FOR WIND TURBINES

(71) Applicant: General Electric Company, Schenectady, NY (US)

(72) Inventors: Kevin Wayne Kinzie, Spartanburg, SC (US); Thomas Joseph Fischetti, Fountain Inn, SC (US); Michael Glen Horn, Saratoga Springs, NY (US)

(73) Assignee: General Electric Company, Schenectady, NY (US)

( * ) Notice: Subject to any disclaimer, the term of this patent is extended or adjusted under 35 U.S.C. 154(b) by 125 days.

This patent is subject to a terminal disclaimer.

(21) Appl. No.: 13/753,957

(22) Filed: Jan. 30, 2013

(65) Prior Publication Data

US 2014/0209040 A1  Jul. 31, 2014

(51) Int. Cl.
*G01K 5/00* (2006.01)
*A01K 29/00* (2006.01)
*A01M 29/18* (2011.01)
*F03D 11/00* (2006.01)
*G10K 5/00* (2006.01)

(52) U.S. Cl.
CPC .............. *A01M 29/18* (2013.01); *F03D 11/00* (2013.01); *G10K 5/00* (2013.01); *Y02E 10/722* (2013.01)

(58) Field of Classification Search
CPC ..... Y02E 10/74; Y02E 10/721; A01M 29/00; A01M 29/16; A01M 29/18; G10K 5/00

USPC .................. 119/719, 713, 908; 416/1, 31, 61; 340/573.2, 384.2; 43/1, 98; 116/137 A
See application file for complete search history.

(56) References Cited

U.S. PATENT DOCUMENTS

| 2,238,668 | A | * | 4/1941 | Wellenstein | 116/137 A |
|---|---|---|---|---|---|
| 3,156,212 | A | * | 11/1964 | Buell, Jr. | 116/137 A |
| 3,157,153 | A | * | 11/1964 | Moe | 116/137 R |
| 3,230,921 | A | | 1/1966 | Spiegel | |
| 3,230,923 | A | * | 1/1966 | Hughes | 116/137 A |
| 3,376,847 | A | | 4/1968 | Cheeseman, Jr. | |
| 3,666,976 | A | * | 5/1972 | Gourlay et al. | 310/324 |
| 3,721,521 | A | | 3/1973 | Schmidlin | |

(Continued)

FOREIGN PATENT DOCUMENTS

DE   102007025314 A1   12/2008
JP        2009191807 A    8/2009

(Continued)

OTHER PUBLICATIONS

Related U.S. Appl. No. 13/406,875, filed Feb. 28, 2012.

(Continued)

*Primary Examiner* — Yvonne Abbott-Lewis
(74) *Attorney, Agent, or Firm* — Dority & Manning, P.A.

(57) ABSTRACT

A wind turbine may include a tower, a nacelle mounted on the tower and a rotor coupled to the nacelle. The rotor may include a hub and at least one rotor blade extending from the hub. In addition, the wind turbine may include a nozzle mounted on or within the tower, the nacelle or the hub. The nozzle may include an inlet and an outlet. Moreover, the nozzle may be configured to accelerate a flow of fluid through the outlet such that an ultrasonic sound emission is produced by the nozzle.

18 Claims, 4 Drawing Sheets

(56) References Cited

U.S. PATENT DOCUMENTS

| | | | |
|---|---|---|---|
| 4,131,340 A | | 12/1978 | Preston |
| 4,131,390 A | * | 12/1978 | Schmidt .................. 416/20 R |
| 4,150,637 A | * | 4/1979 | Penick ..................... 116/58 R |
| 4,437,428 A | * | 3/1984 | Hoffelner ................ 116/137 R |
| 5,791,875 A | | 8/1998 | Ngo |
| 6,250,255 B1 | * | 6/2001 | Lenhardt et al. ............. 119/713 |
| 6,623,243 B1 | | 9/2003 | Hodos |
| 7,370,601 B1 | * | 5/2008 | Williams ................... 116/22 A |
| 7,487,737 B1 | * | 2/2009 | Williams ................... 116/22 A |
| 7,781,944 B2 | * | 8/2010 | Shkolnikov et al. ........... 310/339 |
| 8,093,994 B2 | * | 1/2012 | McGaughy et al. ....... 340/384.2 |
| 8,579,594 B2 | * | 11/2013 | Fuglsang et al. ........... 416/231 R |
| 8,598,998 B2 | * | 12/2013 | Vassilev et al. ............. 340/384.2 |
| 8,869,734 B2 | * | 10/2014 | Livingston ................ 116/137 R |
| 2005/0162978 A1 | | 7/2005 | Lima |
| 2008/0260531 A1 | | 10/2008 | Stommel |
| 2008/0298962 A1 | | 12/2008 | Sliwa |
| 2009/0185900 A1 | | 7/2009 | Hirakata et al. |
| 2009/0295165 A1 | | 12/2009 | Giguere et al. |
| 2010/0143121 A1 | | 6/2010 | Haans et al. |
| 2011/0192212 A1 | | 8/2011 | Delprat et al. |
| 2012/0003089 A1 | * | 1/2012 | Byreddy et al. ................ 416/61 |
| 2013/0050400 A1 | * | 2/2013 | Stiesdal et al. .................. 348/36 |
| 2013/0052010 A1 | * | 2/2013 | Nielsen et al. ..................... 416/1 |
| 2013/0224018 A1 | * | 8/2013 | Kinzie et al. ...................... 416/1 |
| 2013/0249218 A1 | * | 9/2013 | Vassilev et al. .................. 290/55 |
| 2014/0148978 A1 | * | 5/2014 | Duncan et al. ..................... 701/3 |

FOREIGN PATENT DOCUMENTS

| | | |
|---|---|---|
| JP | 2009257322 A | 11/2009 |
| JP | 2010071100 A | 4/2010 |
| WO | WO 2010076500 A1 | 7/2010 |

OTHER PUBLICATIONS

Joseph M. Szewczak, PhD., Ultrasound emissions from wind turbines as a potential attractant to bats: a preliminary investigation. pp. 1-11; Humboldt State University, Arcata, CA; May 1, 2006.

Genevieve R. Spanjer, Responses of the big brown bat, *Eptesicus fusus*, to an acoustic deterrent device in a lab setting. pp. 1-12; University of Maryland; Dec. 2006.

Joseph M. Szewczak, PhD., Preliminary Field Results of an Acoustic Deterrent with the Potential to Reduce Bat Mortality from Wind Turbines. pp. 1-7; Humboldt State University, Arcata, CA; Aug. 23, 2006.

Joseph M. Szewczak, PhD., Field Test Results of a Potential Acoustic Deterrent to Reduce Bat Mortality from Wind Turbines. pp. 1-14; Humboldt State University, Arcata, CA; Oct. 18, 2007.

Jason W. Horn, Edward B. Arnett, Mark Jensen, Thomas H. Kunz, Testing the effectiveness of an experimental acoustic bat deterrent at the Maple Ridge wind farm. pp. 1-30; Bat Conservation International, Austin, TX; Jun. 24, 2008.

Edward B. Arnett, Michael Schirmacher, Effectiveness of Changing Wind Turbine Cut-in Speed to reduce Bat Fatalities at Wind Facilities, 2008 Annual Report. Bat Conservation International; pp. 2-44; Apr. 2009.

Edward B. Arnett, Michael Schirmacher, Effectiveness of Changing Wind Turbine Cut-in Speed to reduce Bat Fatalities at Wind Facilities, Final Report. Bat Conservation International; pp. 2-57; May 2010.

Edward B. Arnett, Cris Hein, Michael Schirmacher, Michael Baker, Evaluating the effectiveness of an ultrasonic acoustic deterrent for reducing bat fatalities at wind turbines, Final Report; pp. 2-45; Dec. 2011.

Edward B. Arnett, Manuela MP Huso, Michael Schirmacher, John Hayes, Frontiers in Ecology and the Environment; Altering Turbine speed reduces bat mortality at wind-energy facilities. pp. 2-8; 2010.

Wind Power and Wildlife in Colorado, Symposium and Workshop, Jan. 23-25, 2006, 27 pages.

10th Meeting of the Advisory Committee, Bratislava, Slovak Republic, Apr. 25-27, 2005, Report of the Intersessional Working Group on Wind Turbines and Bat Populations, 21 pages.

Erin F. Baerwald, et al., A Large-Scale Mitigation Experiment to Reduce Bat Fatalities at Wind-Energy Facilities, Aug. 2009, 5 pages.

Dr. Hermann Hotker, et al., Auswirkungen regenerativer . . . , Dec. 2004, 80 pages.

"Scientists find successful way to reduce bat deaths at wind turbines," Sep. 28, 2009, http://www.physorg.com/news173364700.html.

"Bat deaths from wind turbines explained," Aug. 25, 2008, http://www.ucalgary.ca/news/aug2008/batdeaths.

Bats and Wind Energy Cooperative, Research, Operational Mitigation & Deterrents, 2008, http://www.batsandwind.org/main.asp?page=research&sub=operational.

Denmark Office Action and Search Report for PA201370106, dated Sep. 15, 2014 (5 Pages).

\* cited by examiner

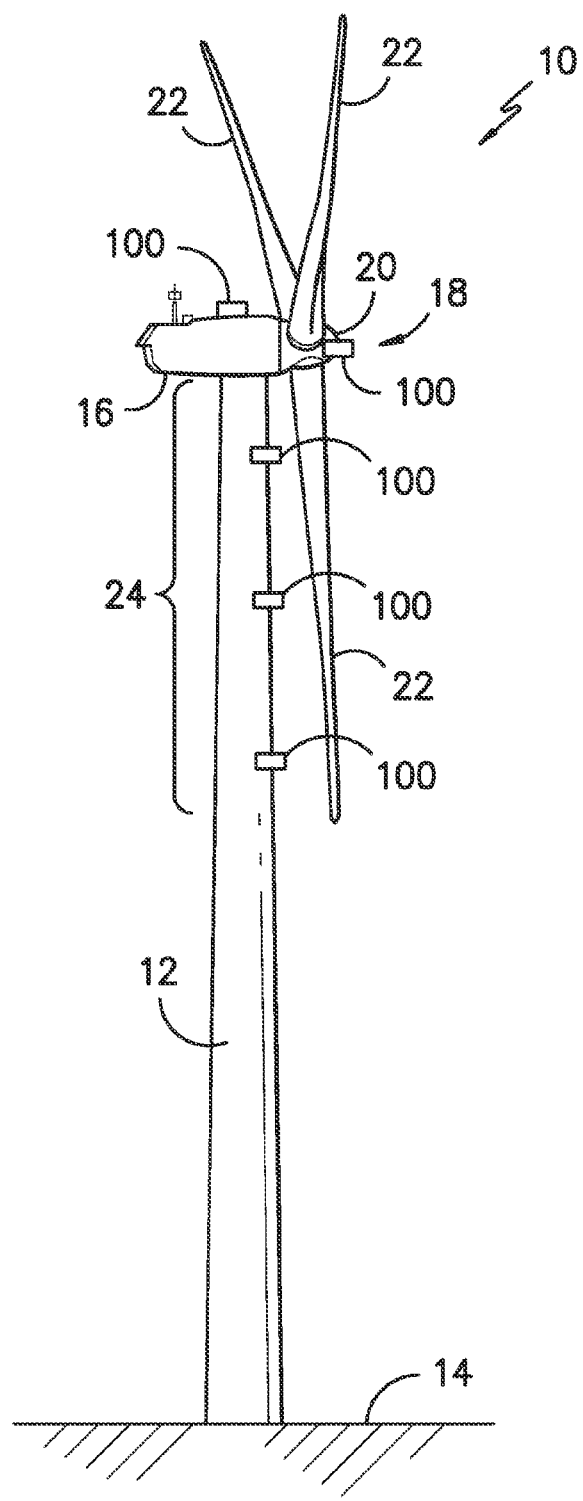
FIG. -1-

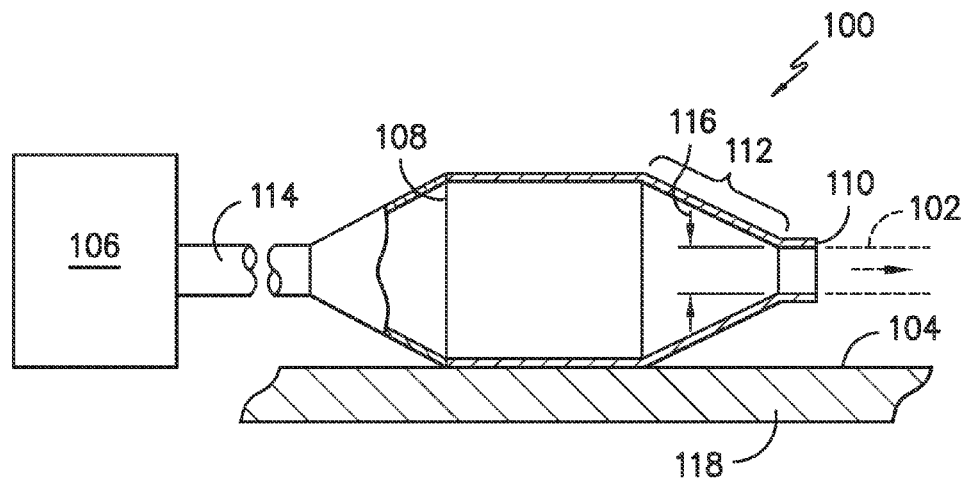
FIG. -2-
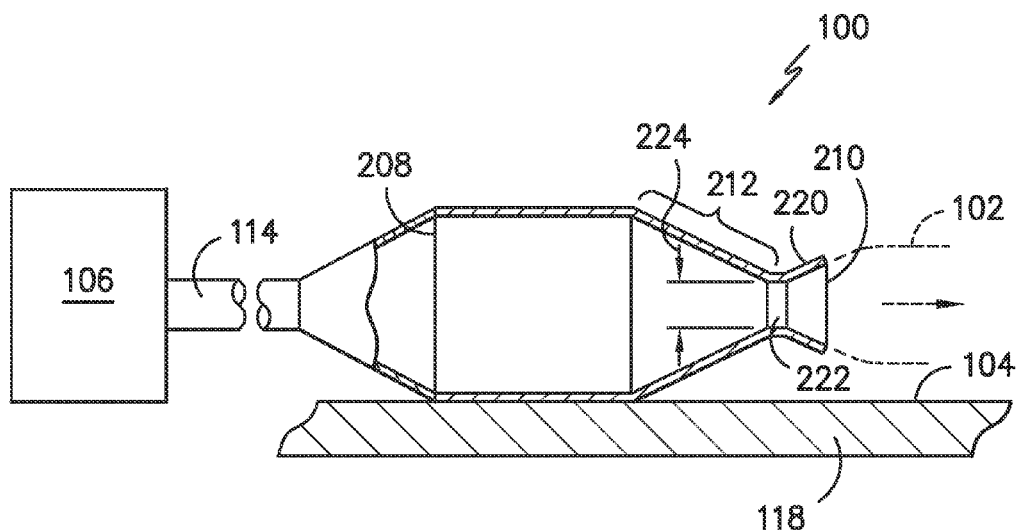
FIG. -3-

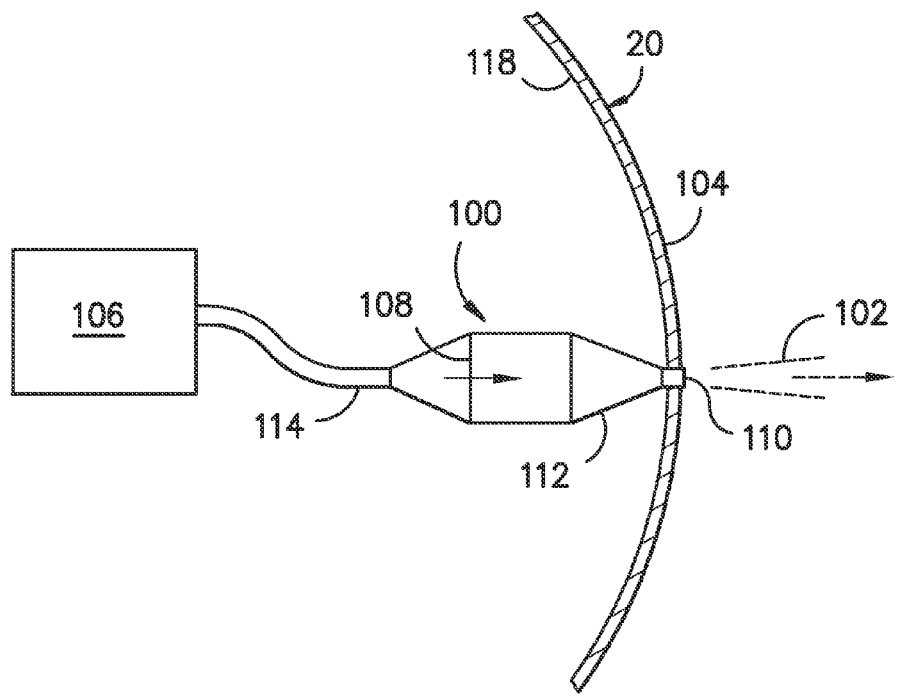
FIG. -4-
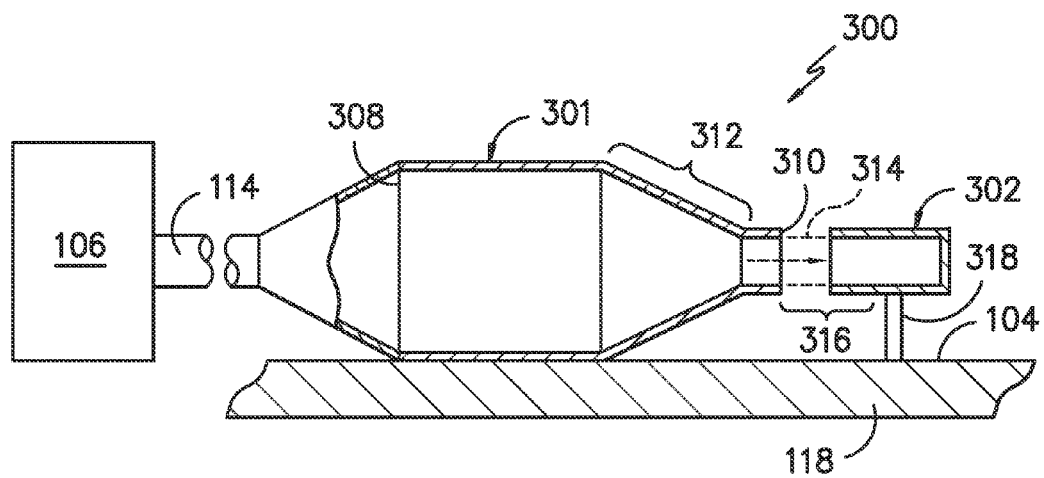
FIG. -5-

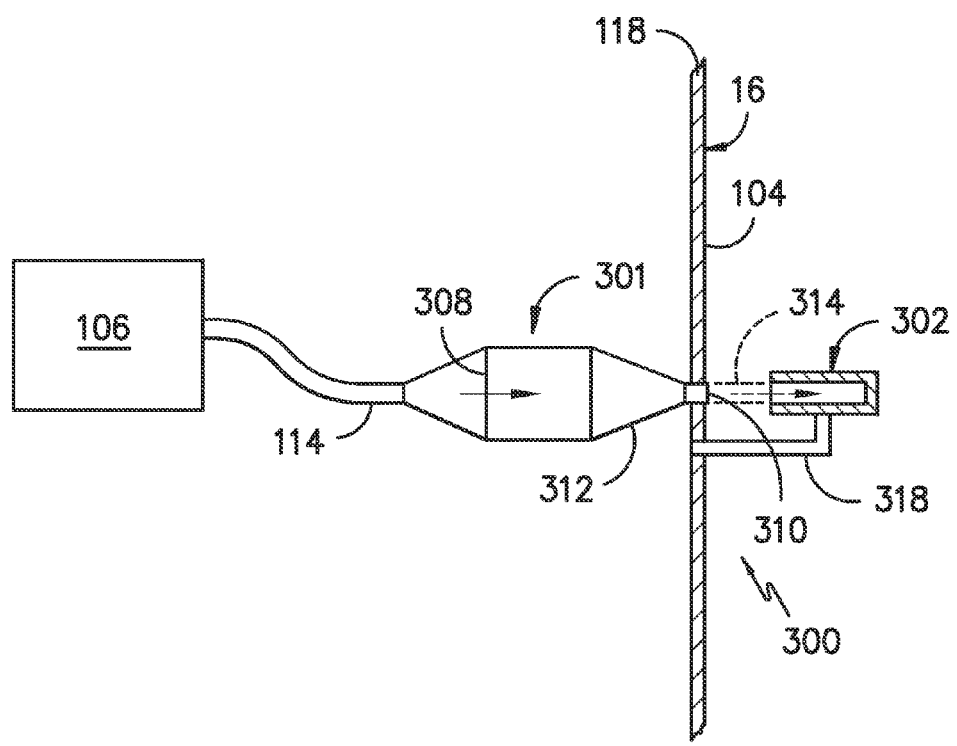
FIG. -6-

ULTRASONIC SOUND EMITTING DEVICES FOR WIND TURBINES

FIELD OF THE INVENTION

The present subject matter relates generally to wind turbines and, more particularly, to ultrasonic sound emitting devices that may be mounted on or within one or more components of a wind turbine to deter bats.

BACKGROUND OF THE INVENTION

Wind power is considered one of the cleanest, most environmentally friendly energy sources presently available, and wind turbines have gained increased attention in this regard. However, while being considered environmentally safe, wind turbines can pose a threat to bats. Specifically, it has been found that bats may have trouble detecting the rotating rotor blades of a wind turbine. As a result, bats can be struck by the rotor blades and killed. The occurrence of such bat strikes have led many to enact regulations and/or laws prohibiting and/or discouraging the placement of wind turbines in areas of high bat populations and/or restricting the operation of wind turbines at night.

Many believe that ultrasonic sound in the frequency range of about 25 kHz to about 100 kHz may be effective at deterring bats by interfering with both the bats' natural sonar and their ability to hunt insects. However, generating enough sound to cover the entire rotor diameter of a wind turbine has proven to be a difficult task. For example, previous attempts have focused on the use of speakers mounted on the nacelle. Unfortunately, due to dissipation of the sound, it has been found that nacelle mounted speakers do not provide for sufficient bat deterrence.

Accordingly, an ultrasonic sound emitting device that is capable of producing sufficient acoustic power to deter bats from a wind turbine would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to an active system for emitting ultrasonic sounds from a wind turbine. The system may include a nozzle configured to be mounted on or within a non-blade component of the wind turbine. The nozzle may include an inlet and an outlet. In addition, the system may include a pressurized fluid source in fluid communication with the inlet. The nozzle may be configured to accelerate a fluid flow derived from the pressurized fluid source through the outlet such that an ultrasonic sound emission is produced by the nozzle.

In another aspect, the present subject matter directed to a wind turbine including a tower, a nacelle mounted on the tower and a rotor coupled to the nacelle. The rotor may include a hub and at least one rotor blade extending from the hub. In addition, the wind turbine may include a nozzle mounted on or within the tower, the nacelle or the hub. The nozzle may include an inlet and an outlet. Moreover, the nozzle may be configured to accelerate a flow of fluid through the outlet such that an ultrasonic sound emission is produced by the nozzle.

In a further aspect, the present subject matter is directed to a method for producing an ultrasonic sound emission from a wind turbine. The method may generally include operating the wind turbine with a nozzle mounted on or within a non-blade component of the wind turbine and supplying a fluid flow through an outlet of the nozzle such that an ultrasonic sound emission is produced by the nozzle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine having a plurality of ultrasonic sound emitting devices mounted on various non-blade components of the wind turbine;

FIG. 2 illustrates a cross-sectional view of one embodiment of an ultrasonic sound emitting device mounted to an exterior surface of a non-blade component of the wind turbine;

FIG. 3 illustrates a cross-sectional view of another embodiment of an ultrasonic sound emitting device mounted to an exterior surface of a non-blade component of the wind turbine;

FIG. 4 illustrates a partial, cross-sectional view of one embodiment of an ultrasonic sound emitting device mounted within a non-blade component of the wind turbine;

FIG. 5 illustrates a cross-sectional view of a further embodiment of an ultrasonic sound emitting device mounted to an exterior surface of a non-blade component of the wind turbine; and, FIG. 6 illustrates a partial, cross-sectional view of another embodiment of an ultrasonic sound emitting device mounted within a non-blade component of the wind turbine.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a wind turbine including one or more ultrasonic sound emitting devices configured to produce sound at a frequency within the ultrasonic range (e.g., from about 25 kHz to about 100 kHz). In several embodiments, the ultrasonic sound emitting devices may be one or more nozzles mounted on and/or within one or more non-blade components of the wind turbine, such as the nacelle, tower and/or hub of the wind turbine. A pressurized fluid source may be in fluid communication with each nozzle such that a fluid flow (e.g., an airflow) is directed into the nozzle and is choked, thereby producing a fluid jet (e.g., a supersonic air jet) at the nozzle outlet that emits sound within the ultrasonic frequency range. It is believed that the ultrasonic sound emitted from the disclosed nozzles may deter bats from flying into and/or adjacent to a wind turbine.

It should be appreciated that the disclosed nozzles may be configured to continuously generate an ultrasonic sound emission during operation of a wind turbine. However, due to the fact that the fluid source may be electronically controlled, fluid may, in several embodiments, only be supplied to nozzles during certain operating periods (e.g., during nighttime operating hours) and/or the fluid may be pulsated through the nozzles such a pulsed or periodic ultrasonic sound emission is generated by the nozzles.

Referring now to the drawings, FIG. 1 illustrates a perspective view of one embodiment of a wind turbine 10. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced. It should be appreciated that, as used herein, the term "hub" may refer to the inner hub component (i.e., the component to which the rotor blades 22 are attached via the pitch bearings), the outer hub component (i.e., the component surrounding the inner hub—often referred to as the "spinner") or a combination of both the inner and outer hub components.

Additionally, in several embodiments, one or more ultrasonic sound emitting devices 100 may be mounted on and/or within one or more non-blade components of the wind turbine 10 to deter bats from flying into and/or adjacent to the wind turbine 10. As used herein, the term "non-blade component" generally refers to any component of the wind turbine 10 not including the wind turbine's rotor blades 22. Thus, non-blade components may include, but are not limited to, the tower 12, the nacelle 16 and the hub 20 of the wind turbine 10.

For example, as shown in FIG. 1, one or more ultrasonic sound emitting devices 100 may be mounted on and/or within the tower 12. It should be appreciated that, when mounting the ultrasonic sound emitting device(s) 100 on and/or within the tower 12, it may be desirable, in one embodiment, to position the device(s) 100 along an upper portion 24 of the tower 12 (i.e., the portion of the tower 12 across which the rotor blades 22 pass during operation of the wind turbine 10). However, in alternative embodiments, the ultrasonic sound emitting device(s) 100 may be mounted on/or within the tower 12 at any other suitable location along its length.

Moreover, one or more ultrasonic sound emitting devices 100 may also be mounted on and/or within the nacelle 16 at any suitable location. For example, as shown in FIG. 1, in one embodiment, an ultrasonic sound emitting device 100 may be mounted at the top of the nacelle 16. In another embodiment, one or more ultrasonic sound emitting devices 100 may be mounted on and/or within one of the sides of the nacelle 16. Similarly, as shown in the illustrated embodiment, one or more ultrasonic sound emitting devices 100 may also be mounted on and/or within the hub 20 at any suitable location, such as at the front of the hub 20.

It should be appreciated that the specific placement and number of the ultrasonic sound emitting devices 100 shown in FIG. 1 is simply provided as one example to illustrate how the disclosed devices 100 may be installed at different locations on and/or within the various non-blade components of the wind turbine 10. Thus, one of ordinary skill in the art should appreciate that, in general, any number of devices 100 (including a single device 100) may be positioned at any suitable location on and/or within the wind turbine 10 in order to deter bats from flying into and/or adjacent to the wind turbine 10.

Referring now to FIG. 2, a cross-sectional view of one embodiment of an ultrasonic sound emitting device 100 is illustrated in accordance with aspects of the present subject matter. As shown, in several embodiments, the ultrasonic sound emitting device 100 may comprise a converging nozzle 100 mounted to an exterior surface 102 of a non-blade component of the wind turbine 10, such as the exterior surface 102 of the tower 12, the nacelle 16 and/or the hub 20. In general, the nozzle 100 may be configured to generate a fluid jet 102 (e.g., a supersonic air jet) as fluid flows through the nozzle 100. Thus, as shown in FIG. 2, the nozzle 100 may be in fluid communication with a suitable pressurized fluid source 106 such that a fluid flow may be directed through the nozzle 100. As will be described below, by appropriately selecting certain dimensions of the nozzle 100, the airflow through the nozzle 100 may be accelerated to the point of choking (i.e., at or above a speed of Mach 1), thereby producing a supersonic jet 102. As the fluid jet 104 exits the nozzle 100, a shock wave-expansion system (i.e., shock cells or a shock cell structure/pattern) is created such that, as the turbulence in the shear layers around the jet 102 interact with the shock cells, an ultrasonic sound emission may be generated within a frequency ranging from about 25 kHz to about 100 kHz.

As particularly shown in FIG. 2, the nozzle 100 may generally include an inlet 108, an outlet 110 and a converging section 112 extending between the inlet 108 and the outlet 110. The inlet 108 may generally be configured to be in fluid communication with the pressurized fluid source 106 to allow a pressurized flow of fluid to be supplied through the nozzle 100. For example, as shown in FIG. 2, the inlet 108 may in fluid communication with the fluid source 106 via a hose or other suitable fluid conduit 114. The converging section 112 may generally correspond to a portion of the nozzle 100 along which the cross-sectional area of the nozzle 100 steadily decreases between the inlet 108 and the outlet 110, thereby causing the air entering the inlet 108 to be accelerated as its flows through the converging section 112. Thus, by appropriately selecting the size of the outlet 110, the fluid flow through the converging section 110 may be choked as it reaches the outlet 110. As is generally understood, the cross-sectional area required to choke the fluid flow may generally vary depending on the total mass flow through the nozzle 100 and the total pressure of the flow. However, in several embodiments, the outlet 110 may have a diameter 116 ranging from about 1 millimeter (mm) to about 15 mm, such as from about 1 mm to about 5 mm or from about 5 mm to about 15 mm and all other subranges therebetween. However, it is foreseeable by the inventors of the present subject matter that the diameter 116 of the outlet 110 may be smaller and/or larger than then values contained within the ranges described above.

It should be appreciated that, in several embodiments, the diameter 116 of the outlet 110 may be selected so as to specifically tailor the frequency of the ultrasonic sound emission produced by the nozzle 100. For instance, in one embodiment, an outlet diameter 116 ranging from about 5 mm to about 15 mm may be utilized to produce ultrasonic sound at a frequency of about 25 kHz while an outlet diameter 116 ranging from about 1 mm to about 5 mm may be utilized to produce ultrasonic sound at a frequency of about 100 kHz. Accordingly, it may be desirable to position multiple nozzles 100 having different outlet diameters 116 at various locations on the wind turbine 10 such that ultrasonic sound emissions at different frequencies may be produced.

It should be appreciated that the nozzle 100 may generally be configured to be mounted to the exterior surface 102 using any suitable fastening means and/or method known in the art. As used herein, a nozzle 100 may be mounted to the exterior surface 102 of a non-blade component by being directly or indirectly coupled to such surface 102. Thus, in several embodiments, the nozzle 100 may be mounted to the tower 12, nacelle 16 or hub 20 using one or more suitable fastening mechanisms (e.g., screws, bolts, pins, rivets, and/or the like) and/or by using one or more coupling devices (e.g., brackets, frames, support members and/or the like).

Moreover, it should be appreciated that the pressurized fluid source 106 may generally comprise any suitable device, container and/or the like that allows for a pressurized fluid (e.g., pressurized air) to be supplied to the nozzle 100. For example, in one embodiment, the pressurized fluid source 106 may comprise an air compressor or any suitable vessel containing pressurized fluid. In addition, when the wind turbine 10 includes multiple nozzles 100, each nozzle 100 may be in fluid communication with a single fluid source 106 or multiple fluid sources 106 may be utilized to supply pressurized fluid to the nozzles 100.

Additionally, it should be appreciated that, in several embodiments, the pressurized fluid source 106 may be configured to supply fluid to the nozzle 100 at a constant pressure or at a variable pressure. For example, in a particular embodiment, the fluid source 106 may be configured to module the pressure of the fluid supplied to the nozzle 100 in order to modulate the frequency of the ultrasonic sound emission produced by the nozzle 100. Such modulation of the fluid pressure may, in several embodiments, be regulated via a controller or other suitable computing device commutatively coupled to the fluid source 106, thereby allowing the frequency of the ultrasonic sound emission to be automatically increased or decreased as the pressure is adjusted.

It should also be appreciated that the pressurized fluid source 106 may generally be configured to be positioned at any suitable location relative to the nozzle 100. For example, in one embodiment, the fluid source 106 may be configured to be mounted to the exterior surface 102 adjacent to the location of the nozzle 100. In another embodiment, the fluid conduit 114 coupling the fluid source 106 to the nozzle 100 may extend through a wall 118 of the non-blade component (e.g., a wall 118 of the tower 12, the nacelle 16 and/or the hub 20) such that the fluid source 106 may be housed within the interior of such component. In other embodiments, the fluid source 106 may be disposed at any other suitable location relative to the nozzle 100. For instance, the fluid source 106 may be located on the support surface 14 or ground adjacent to the wind turbine 10 and the fluid conduit 114 may be configured to extend between the nozzle 110 and the fluid source 106 along the interior of the wind turbine 10 (e.g., through the interior of the tower 12, the nacelle 16 and/or the hub 20) or along the exterior of the wind turbine 10.

Additionally, it should be appreciated that, in alternative embodiments, the nozzle 100 need not be configured as a converging nozzle. For example, in one embodiment, the nozzle 100 may simply be configured as a thin walled tube or orifice defining a constant diameter between the outlet 108 and the inlet 110.

Referring now to FIG. 3, a cross-sectional view of another embodiment of the nozzle 100 shown in FIG. 2 is illustrated in accordance with aspects of the present subject matter. As shown, the nozzle 100 may be configured as a de Laval or any other suitable convergent-divergent nozzle. Thus, in addition to having an inlet 208, an outlet 210 and a converging section 212, the nozzle 100 may also include a diverging section 220 extending between the converging section 212 and the outlet 210. In such an embodiment, a nozzle throat 222 may be located between the converging section 212 and the diverging section 220 and may define the point at which the cross-sectional area of the nozzle 100 transitions from decreasing (along the converging section 212) to increasing (along the diverging section 220).

By configuring the nozzle 100 in the manner shown in FIG. 3, the fluid flow may, for example, be accelerated to a supersonic speed as it flows through the converging section 212 and into the nozzle throat 222. Thus, similar to the outlet 110 described above, the size of the nozzle throat 222 may generally be selected based on the total mass flow through the nozzle 100 and the total pressure of the flow. For example, in several embodiments, the nozzle throat 222 may have a diameter 224 ranging from about 1 millimeter (mm) to about 15 mm, such as from about 1 mm to about 5 mm or from about 5 mm to about 15 mm and all other subranges therebetween. However, it is foreseeable by the inventors of the present subject matter that the diameter 224 of the nozzle throat 220 may be smaller and/or larger than the values contained within the ranges described above.

In addition, by configuring the nozzle 100 to include the diverging section 220, the fluid jet 102 traveling through the nozzle throat 222 may expand as it flows through the diverging section 220. Such expansion may generally allow the shape of fluid jet 102 to be modified as it exits through the outlet 210, thereby altering the frequency of the ultrasonic sound emitted by the nozzle 100. It should be appreciated that the diameter/cross-sectional area to which the nozzle 100 increases between the throat 222 and the outlet 210 may generally vary depending on the sound characteristics desired to be achieved, the dimensions of the nozzle throat 222 and/or various other parameters/conditions. However, in several embodiments, a ratio of the cross-sectional area of the outlet 210 to the cross-sectional area of the throat 222 may range from about 1:1 to about 1.2:1, such as from about 1.03:1 to about 1.1:1 or from about 1.1:1 to about 1.2:1 and all other subranges therebetween. However, it is foreseeable by inventors of the present subject matter that the ratio of the cross-sectional area of the outlet 210 to the cross-sectional area of the throat 222 may be smaller and/or larger than then values contained within the ranges described above.

It should be appreciated that, in addition to being mounted to an exterior surface 102 of one or more of the non-blade components of the wind turbine 10, the nozzles 100 described above may also be at least partially mounted within such component(s). For example, FIG. 4 illustrates the nozzle 100 shown in FIG. 2 mounted partially within the interior of the front portion of the hub 20. Specifically, as shown, the nozzle 100 may be mounted within the hub 20 such that the outlet 108 extends through a wall 118 of the hub 20 to its exterior surface 102. As such, the fluid jet 102 generated within the nozzle 100 may be expelled to the exterior of the hub 20, thereby ensuring that the ultrasonic sound emission generated as the jet 102 exits the nozzle 100 propagates outwardly from the hub 20.

Alternatively, as indicated above, the nozzles 100 may be mounted within any other suitable non-blade component of the wind turbine 10. For example, instead of being a wall 118 of the hub 20, the wall 118e shown in FIG. 4 may correspond to a wall 118 of the tower 12 and/or a wall 118 of the nacelle 16.

Referring now to FIG. 5, a cross-sectional view of another embodiment of an ultrasonic sound emitting device 300 that may be mounted to an exterior surface 102 of one or more of the non-blade components of the wind turbine 10 is illustrated in accordance with aspects of the present subject matter. As shown, the ultrasonic sound emitting device 300 may be configured as a Hartmann generator or any other suitable powered resonance tube. Thus, the device 300 may include both a converging nozzle 301 and a closed-end tube 302 disposed downstream of the nozzle 301.

In general, the nozzle 301 may be configured the same as or similar to the nozzle 100 described above with reference to FIG. 2. For example, as shown in FIG. 5, the nozzle 301 may include an inlet 308, an outlet 310 and a converging section 312 extending between the inlet 308 and the outlet 310. In addition, the nozzle 201 may in fluid communication with a suitable pressurized fluid source 106. As described above, the nozzle 301 may generally be configured to generate a fluid jet 314 (e.g., a supersonic air jet) as fluid flows through the nozzle 301.

Similar to various Hartmann generators and/or other powered resonance tubes known in the art, the closed-end tube 302 may generally be configured to have the same diameter and/or cross-sectional area as the nozzle outlet 310 and may be aligned with the outlet 310 such that the fluid jet 314 exiting the nozzle 301 is directed into the tube 302. Thus, by positioning the tube 302 relative to the outlet 310 so that the tube 302 is disposed within a compression region 316 of the shock cell structure/pattern created at the outlet 310 as the jet 314 exits the nozzle 301, a strong flow instability (including successive compression and expansion waves) may be created within the tube 302. As a result of such flow instability, an ultrasonic sound emission may be generated by the ultrasonic sound emitting device 300 at a frequency ranging from about 25 kHz to about 100 kHz.

It should be appreciated that the closed-end tube 302 may generally be mounted in alignment with the nozzle outlet 310 using any suitable attachment means known in the art. For example, as shown in FIG. 5, the tube 302 may be mounted to the exterior surface 102 using any suitable coupling 318 (e.g., a pin, bolt, rod and/or other suitable linkage) that permits the tube 302 to be positioned in alignment with the nozzle outlet 310. Alternatively, the tube 302 may be held in alignment with the nozzle outlet 310 via a coupling or linkage extending between the tube 302 and the nozzle 301.

Referring now to FIG. 6, the ultrasonic sound emitting device 300 shown in FIG. 5 is illustrated in a configuration in which the nozzle 301 is partially mounted through a wall 118 of one of the non-blade components of the wind turbine 10. Specifically, in the illustrated embodiment, the nozzle 301 is mounted within the nacelle 16 such that the outlet 310 extends through the wall 118 of the nacelle 16. As such, the fluid jet 314 generated within the nozzle 301 may be expelled to the exterior of the nacelle 16. Additionally, as shown, the closed-end tube 302 may be mounted outside the nacelle 16 (e.g., by using a suitable coupling 318) such that the tube 302 is generally aligned with the nozzle outlet 310. Thus, the fluid jet 314 generated by the nozzle 301 may be directed into the closed-end tube 302, thereby producing an ultrasonic sound emission propagating outwardly from the nacelle 16.

Alternatively, as indicated above, the nozzle 301 may be configured to be mounted within any other suitable non-blade component of the wind turbine 10. For example, instead of being a wall 118 of the nacelle 16, the wall 118 shown in FIG. 6 may correspond to a wall 118 of the tower 12 and/or a wall 118 of the hub 20.

It should be appreciated that the present subject matter is also directed to an active system and method for producing an ultrasonic sound emission from a wind turbine 10. In several embodiments, the system may generally include one or more of the disclosed nozzles 100, 301 in fluid communication with one or more suitable fluid sources 106. Additionally, in several embodiments, the method may generally include operating the wind turbine 10 with a nozzle 100, 301 mounted on and/or within a non-blade component of the wind turbine 10 and supplying a fluid flow through the nozzle 100, 301 such that an ultrasonic sound emission is produced.

Additionally, it should be appreciated that the ultrasonic sound emissions produced by the disclosed nozzles may generally travel from the nozzles in a cone-shaped sound path. Thus, it may be desirable to orient the nozzles on a wind turbine 10 such that the sound emissions are directed towards the locations at which bats are to be deterred. For example, in one embodiment, the nozzles installed on a particular wind turbine 10 may be oriented such that the sound emissions are directed toward the front of the wind turbine 10 (i.e., along the side of the nacelle 16 at which the rotor blades 22 are located).

It should also be appreciated that, although the present subject matter has been described herein as using nozzles to produce ultrasonic sound emissions, various other ultrasonic sound emitting devices may also be used to deter bats from a wind turbine 10. For example, in one embodiment, a speaker capable of producing ultrasonic sound emissions may be mounted on and/or within one or more of the non-blade components of the wind turbine 10. Alternatively, various other devices, such as a powered Helmholtz resonator, a dual bi-morph synthetic jet and/or the like, may be mounted on or within one or more of the non-blade components in order to produce ultrasonic sound emissions.

Moreover, although the present subject matter has been described primarily as using nozzles to produce a supersonic fluid jet, ultrasonic sound emissions may also be produced with sub-sonic fluid jets. Thus, it should be appreciated that the disclosed subject matter may generally be utilized to generate any suitable fluid jet that is capable of producing an ultrasonic sound emission.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An active system for emitting ultrasonic sounds from a wind turbine, the system comprising:

a nozzle configured to be mounted on or within a non-blade component of the wind turbine, the nozzle including an inlet and an outlet; and a pressurized fluid source in fluid communication with the inlet, wherein the nozzle is configured to accelerate a fluid flow derived from the pressurized fluid source through the outlet such that an ultrasonic sound emission is produced by the nozzle,
wherein the outlet extends through a wall of the non-blade component.

2. The system of claim 1, wherein the non-blade component comprises one of a tower, a nacelle or a hub of the wind turbine.

3. The system of claim 1, wherein the outlet has a diameter ranging from about 1 mm to about 15 mm.

4. The system of claim 1, wherein the nozzle further comprises a converging section extending between the inlet and the outlet.

5. The system of claim 4, wherein the nozzle further comprises a diverging section downstream of the converging section, a nozzle throat being defined between the converging and diverging sections.

6. The system of claim 1, further comprising a closed-end tube disposed downstream of the nozzle such that the fluid exiting the outlet is directed into the closed-end tube.

7. A wind turbine, comprising:
a tower;
a nacelle mounted on the tower;
a rotor coupled to the nacelle, the rotor including a hub and at least one rotor blade extending from the hub; and,
a nozzle mounted on or within the tower, the nacelle or the hub, the nozzle including an inlet and an outlet,
wherein the nozzle is configured to accelerate a flow of fluid through the outlet such that an ultrasonic sound emission is produced by the nozzle.

8. The wind turbine of claim 7, wherein the nozzle is mounted to an exterior surface of the tower, the nacelle or the hub.

9. The wind turbine of claim 7, wherein the outlet has a diameter ranging from about 1 mm to about 15 mm.

10. The wind turbine of claim 7, wherein the nozzle further comprises a converging section extending between the inlet and the outlet.

11. The wind turbine of claim 10, wherein the nozzle further comprises a diverging section downstream of the converging section, a nozzle throat being defined between the converging and diverging sections.

12. The wind turbine of claim 7, wherein the outlet extends through a wall of the tower, the nacelle or the hub.

13. The wind turbine of claim 7, further comprising a pressurized fluid source in fluid communication with the inlet.

14. The wind turbine of claim 7, further comprising a closed-end tube disposed downstream of the nozzle such that the fluid exiting the outlet is directed into the closed-end tube.

15. The wind turbine of claim 7, wherein the nozzle is mounted on or within the tower.

16. The wind turbine of claim 7, wherein the nozzle is mounted on or within the nacelle.

17. The wind turbine of claim 7, wherein the nozzle is mounted on or within the hub.

18. A method for producing an ultrasonic sound emission from a wind turbine, the method comprising:
operating the wind turbine with a nozzle mounted on or within a non-blade component of the wind turbine; and
supplying a fluid flow through an outlet of the nozzle such that an ultrasonic sound emission is produced by the nozzle.

* * * * *